Figure 1:
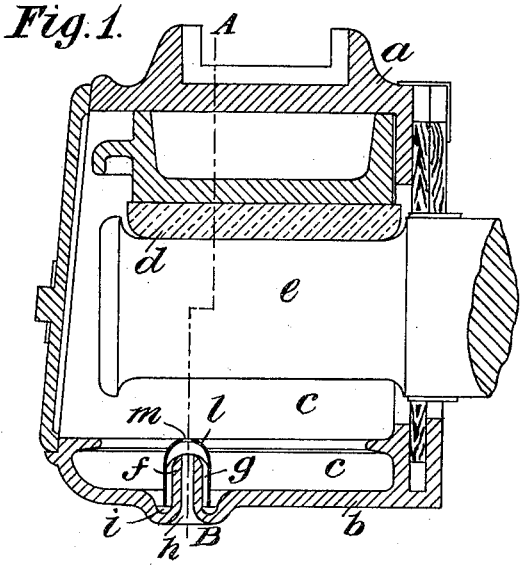

J. B. BEADMAN & H. J. MACKLIN.
AXLE BOX AND OTHER BEARING.
APPLICATION FILED DEC. 27, 1911.

1,084,191. Patented Jan. 13, 1914.

Witnesses
F. M. Stucker
C. H. Fesler

Inventors
Joseph B. Beadman
Harry J. Macklin
by
Attorneys

UNITED STATES PATENT OFFICE.

JOSEPH BLOCKLEY BEADMAN, OF KEIGHLEY, AND HARRY JOHNSON MACKLIN, OF ULVERSTON, ENGLAND.

AXLE-BOX AND OTHER BEARING.

1,084,191.   Specification of Letters Patent.   Patented Jan. 13, 1914.

Application filed December 27, 1911. Serial No. 668,109.

*To all whom it may concern:*

Be it known that we, JOSEPH BLOCKLEY BEADMAN and HARRY JOHNSON MACKLIN, residing, respectively, at 2 West View Terrace, Keighley, in the county of York, England, and 49 Lightburn road, Ulverston, in the county of Lancaster, England, have invented new and useful Improvements in or Relating to Axle-Boxes and other Bearings, of which the following is a specification.

This invention relates to improvements in that type of oil axle boxes such as are used for railway wagons and other vehicles, in which in some cases side chambers have been provided for the reception of the lubricant in either a solid or liquid form raised by a pad underneath and in contact with the journal, or by a siphon on its top, whereby the lubricant is not only conveyed to the axle, but provision is also made for the reception of the surplus oil when the wagon is in a tipping position. This invention may also be adapted for use with other bearings in which there is a constant supply of oil kept.

Hitherto great difficulty has been experienced in the efficient lubrication of the journal owing to water having gained access or admission to the interior of the axle box and descending into its interior and becoming mixed with the oil, the water sinks to the bottom of the oil chamber and raises the level of the oil,—which then floats on the top of the water,—higher than some portion of the back of the axle box, thereby allowing the oil to run out and be lost. If this is allowed to be carried to excess the whole of the oil may escape, and only the water will remain for lubrication purposes, which is often the cause of a bearing becoming heated, and is commonly known as a "hot box".

The object of this invention is to so construct the axle box,—with or without side chambers,—with means whereby the water is automatically separated from the oil by gravitation,—the water being heavier than the oil,—and allowed to escape from the axle box thereby enabling the oil to better lubricate the journal of the axle or other part of the machinery to which the invention is applied. Further, to be adapted to locomotive axle boxes or other bearings in which the oil well is formed above the axle or other shaft, as well as to adapt it to axle boxes or bearings for end or for tilting wagons, or bearings that are occasionally required to be placed out of their vertical position then the said boxes or bearings are provided with side chambers for collecting the oil and water and preventing it escaping from the axle box, or other bearing except through the means hereinafter described. The said means for removing the water from the axle box or other bearing may be applied to existing axle boxes, or it may be arranged to form part of a new box. When used for existing wagon axle boxes the principal parts of this invention will form part of a casting adapted to be fixed to, and combined with, the underside of the axle box by set screws and with or without an asbestos or other packing interposed between the same.

According to this invention one or more recesses or wells for the reception of the water is or are formed in or attached to the oil well or other lubricant receiving space which may or may not have side chambers. From each recess or well projects in an upward direction a hollow pillar formed in one or more pieces and open at both ends and provided with or without projections or angles on its perimeter and with, or without, a metal covering tube with a curved top in which is a central hole. When the covering tube is used it is placed over the said angles or projections. In cases where the covering tube is dispensed with the hole is formed in the tube. In some cases the tube is formed in the axle box by means of a division being cast in, or formed on, one or both sides of the axle box. In this case the cover is dispensed with and the communication is made directly with the well either by means of holes in the bottom of the box, or by the partition not extending to the bottom of the recess.

Figure 2:
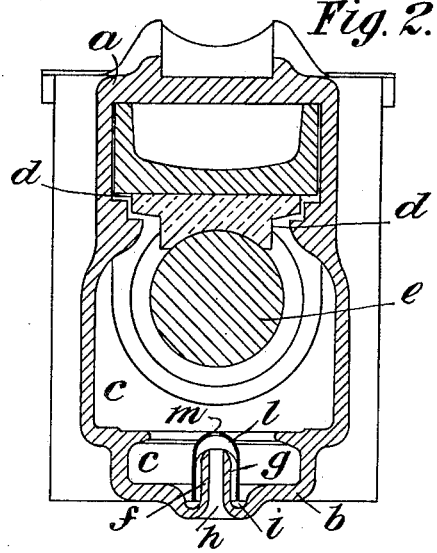
Figure 3:
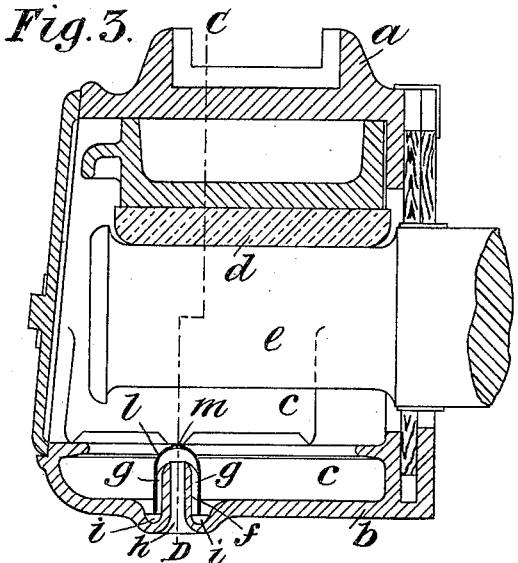
Figure 4:
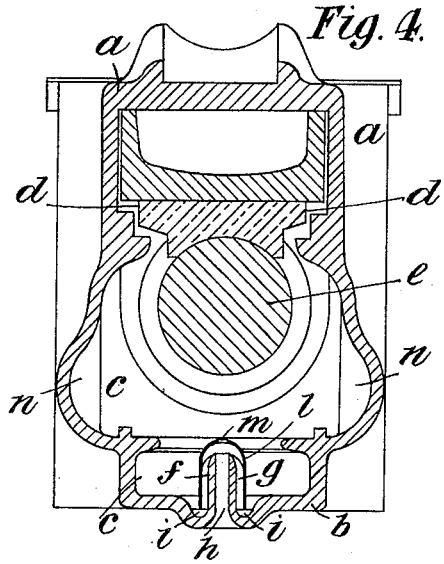
Figure 5:
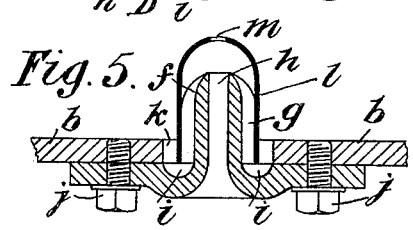
Figure 6:
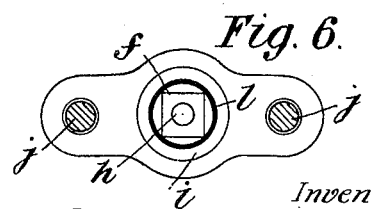

In the accompanying drawings:—Figure 1. is a sectional elevation of an axle box as usually employed on a railway wagon, and with this invention applied thereto; Fig. 2. is a transverse section of same on line A, B, Fig. 1; Fig. 3. is a sectional elevation of an axle box constructed according to this invention with enlarged sides so as to form an internal recess on each side of the axle box; Fig. 4 is a transverse section of same on line C, D, Fig. 2; Fig. 5. is an enlarged elevation of a detachable hollow tube and its perforated cover shown applied to the bottom of an axle box; Fig. 6. is a plan of Fig. 5.

Like parts in all the views are marked with similar letters of reference.

*a* is a railway wagon axle box of ordinary construction made of iron or steel. *b* the bottom of the same. *c* the well or space for the reception of oil, and *d* the bush. The axle box is provided with a lubricating pad mounted upon springs. These last named parts are not shown in the drawings. *e* the axle of the wagon.

All the above parts are of the usual and ordinary construction, and will be readily understood without further description.

At Figs. 1 to 6 *f* is a hollow pillar which is open both at the top and at the bottom, and it is made to project in an upward direction from the bottom of the well or oil space. The perimeter of the hollow pillar in cross section is either a triangle, or a square, or a polygon, or it is made circular, or fluted, or provided with projections *g*, or angles on the perimeter. At Fig. 6 the hollow pillar is shown in square form but we distinctly wish it to be understood that the hollow pillar is not limited to this particular shape. The projections may or may not extend the full length of the hollow pillar. In the drawings they are shown to extend nearly the full length of the said pillar and to be rounded off on their upper edges, but if desired, when made to extend the full length they will be level with the top of the pillar. The thickness of the hollow pillar *f* at its top is shaped in any suitable manner, such as, say, each side of the central hole *h* in the space between the angles or projections *g* is curved as shown, or semi-circular, or angular, so as to permit of the water passing freely to the central hole.

The hollow pillar *f* is made either to form part of the bottom of the axle box,—as shown at Figs. 1 to 4,—or it is made in a separate casting, as shown at Figs. 5 and 6. In either case the recess or well *i* in the well or oil space *c* is provided below the internal level of the bottom *b* of the axle box, and the said bottom may be made, if so desired, on an incline, as shown at Fig. 4, so that the water will first seep or drain into the recess *i*. When the hollow pillar *f* is made to form part of a detachable casting it is secured to the bottom of the axle box by set screws *j* and a hole *k* of about the same diameter as recess or well *i* is formed in the bottom *b* of the axle box through which the hollow pillar is made to pass.

Around the hollow pillar *f* is placed a metal tube *l* of such an internal diameter that it will readily fit over the angles or projections *g* of the hollow pillar, and by this means is held in position. The upper end of tube *l* is either closed, or it is bent or formed over inwardly or outwardly and provided with a central hole *m* of any suitable diameter to admit air to the hollow pillar. When the upper edge of the tube *l* is turned inward, the top of the said tube is arranged to be a suitable distance above the top of the pillar so as to leave a space between the two parts. A space is also left between the bottom of the tube *l* and the recess or well *i*, as shown at Figs. 1 to 5 of the drawings.

Sight holes, with or without covers, may or may not be provided in the axle box, but such are not shown in the drawings.

In order to make provision for the axle box being applied to end tilting wagons the axle box *a* is provided on each side thereof with an internal recess or side chamber *n* for the collection of any oil that will run to the side of the axle box when fixed to an end tilting wagon. Such recess *n* will require the axle box to be shaped transversely, as shown at Fig. 4 of the drawings.

Water being of greater specific gravity than oil descends into the well *i*, and as it accumulates therein it will pass under the covering tube *l* and up into the space between the inner periphery of tube *l* and the outer perimeter of the hollow pillar until it reaches the top of the same when the water will flow down the central hole *h* in the pillar *f* and thus pass out of the axle box leaving the oil therein to lubricate the axle *e*, or bearing in the usual manner. The top *l* prevents the water from returning again to the axle box. It will readily be understood that the oil in the axle box never reaches the level of the top of the tube *l* that surrounds the hollow pillar but is raised to the axle *e* for lubricating purposes by a pad of ordinary construction.

It will readily be understood that the herein described water recess or well, hollow pillar, and its covering tube may if desired, be readily applied to, or combined with, an axle box having an oil well or space arranged above the axle *e*.

What we claim is:—

1. In an axle box for use on railway vehicles containing a receptacle for liquid lubricants, a depression in the lowest part of said receptacle forming a well into which all water entering said receptacle will gravitate, a pillar or stem projecting upward from the bottom of said depression and having a vertical opening therethrough to the outside of the axle box, vertical ribs being formed on the exterior of said pillar or stem, a tube surrounding said pillar or stem in contact with said ribs and spaced from the other portions of its exterior surface to form passageways through which water may flow, said surrounding tube being open at the bottom and having an opening in its upper end.

2. In an axle box for use on railway vehicles containing a receptacle for liquid lubricants, a depression in the lowest part of said receptacle forming a well into which all water entering said receptacle will gravitate, a pillar or stem projecting upwardly from the bottom of said depression and integrally formed therewith, said pillar having a vertical opening therethrough communicating with the exterior of the axle box, and having a number of longitudinal ribs on its exterior surface, a tube open at the bottom and partially closed at its upper end surrounding said pillar or stem and supported thereon by said longitudinal ribs, the spaces between said ribs forming passageways through which water may flow upwardly to the top of the stem and out through its central perforation.

JOSEPH BLOCKLEY BEADMAN.
HARRY JOHNSON MACKLIN.

Witnesses:
W. FAIRBURN-HART,
WILLIAM SADLER.

Copies of this patent may be obtained for five cents each, by addressing the "Commissioner of Patents, Washington, D. C."